US012377390B2

(12) United States Patent
Gautieri et al.

(10) Patent No.: US 12,377,390 B2
(45) Date of Patent: Aug. 5, 2025

(54) DILUTION NOZZLE ASSEMBLY FOR HAZARDOUS GASES

(71) Applicant: G2 Innovations LLC, Gladstone, MO (US)

(72) Inventors: Steven Gautieri, Gladstone, MO (US); Michael Gautieri, Gladstone, MO (US); Frank Wewers, Lenexa, KS (US)

(73) Assignee: G2 Innovations LLC, Gladstone, MO (US)

( * ) Notice: Subject to any disclaimer, the term of this patent is extended or adjusted under 35 U.S.C. 154(b) by 0 days.

(21) Appl. No.: 18/906,498

(22) Filed: Oct. 4, 2024

(65) Prior Publication Data

US 2025/0114755 A1 Apr. 10, 2025

Related U.S. Application Data

(60) Provisional application No. 63/588,873, filed on Oct. 9, 2023.

(51) Int. Cl.
*B01F 25/312* (2022.01)
*B01F 25/313* (2022.01)
*B01F 25/314* (2022.01)

(52) U.S. Cl.
CPC .... *B01F 25/31252* (2022.01); *B01F 25/3121* (2022.01); *B01F 25/31242* (2022.01); *B01F 25/31243* (2022.01); *B01F 25/3131* (2022.01); *B01F 25/314* (2022.01)

(58) Field of Classification Search
CPC .............. B01F 15/00285; B01F 5/0426; B01F 5/0428; B01F 5/043; B01F 5/0498; B01F 3/026; B01F 5/0413; B01F 35/2202; B01F 23/19; B01F 25/31241; B01F 25/31242; B01F 25/31243; B01F 25/32; B01F 25/312; B01F 25/31252; B01F 25/3131; B01F 25/3121; B01F 25/313; B01F 25/314; C10L 3/00; C10L 3/06; C10L 3/10; Y02E 50/30
USPC ........................................................ 366/163.2
See application file for complete search history.

(56) References Cited

U.S. PATENT DOCUMENTS

| | | | | |
|---|---|---|---|---|
| 2,361,150 A * | 10/1944 | Petroe | B01F 25/3131 | 366/175.2 |
| 2,560,069 A * | 7/1951 | Bloomer | B01F 25/3131 | 55/455 |
| 3,147,717 A * | 9/1964 | Smith | A23G 9/285 | 366/184 |

(Continued)

FOREIGN PATENT DOCUMENTS

| | | |
|---|---|---|
| JP | 2006-200445 A2 | 8/2006 |
| JP | 2021-134991 A2 | 9/2021 |
| KR | 10-2011-0076630 A | 7/2011 |

OTHER PUBLICATIONS

International Search Report and Written Opinion in related PCT Application PCT/US2024/050367 mailed Jan. 17, 2025, 13 pages.

*Primary Examiner* — Charles Cooley
(74) *Attorney, Agent, or Firm* — HOVEY WILLIAMS LLP

(57) ABSTRACT

A dilution nozzle assembly for attachment to a rooftop vent pipe for diluting and dispersing hazardous gases vented from the vent pipe includes an exhaust tube connected to the vent pipe and a venturi nozzle positioned in the exhaust tube for diluting and dispersing the hazardous gases vented from the vent pipe as they pass through the exhaust tube.

15 Claims, 11 Drawing Sheets

(56) References Cited

U.S. PATENT DOCUMENTS

| | | | | |
|---|---|---|---|---|
| 4,157,241 | A * | 6/1979 | Samuelson | F23N 1/105 126/91 A |
| 4,184,417 | A | 1/1980 | Chancellor | |
| 5,163,830 | A * | 11/1992 | Pfefferkorn | F23D 14/62 431/355 |
| 2008/0200108 | A1 | 8/2008 | Kupferberg | |
| 2011/0305102 | A1* | 12/2011 | Berger | B01F 25/3132 366/154.1 |
| 2025/0114755 | A1* | 4/2025 | Gautieri | B01F 25/31252 |
| 2025/0135413 | A1* | 5/2025 | Gautieri | B01F 25/314 |

* cited by examiner

DILUTION NOZZLE ASSEMBLY FOR HAZARDOUS GASES

CROSS-REFERENCE TO RELATED APPLICATIONS

The current patent application is a non-provisional utility patent application which claims priority benefit, with regard to all common subject matter, of earlier-filed U.S. Provisional Application Ser. No. 63/588,873; titled "EXPLOSION PROOF NOZZLE FOR EVAPORATIVE WATER COOLING, DRY HUMIDIFICATION, AND VOLATILE CHEMICAL DILUTION WITH UPWARD THRUST"; and filed Oct. 9, 2024. The Provisional Application is hereby incorporated by reference, in its entirety, into the current patent application.

BACKGROUND OF THE INVENTION

Hazardous gases are often vented through rooftop vents to dilute and disperse the gases into the atmosphere. For example, anhydrous ammonia, which is often used as a refrigerant in industrial refrigeration systems, is highly toxic, and exposure to it can cause severe irritation to the eyes, skin, and respiratory system and in severe cases even death. Component failure in refrigeration systems can lead to unexpected pressure buildups of anhydrous ammonia, which must be vented to prevent explosions. Industrial refrigeration systems therefore often include overpressure safety valves to deliver over pressurized ammonia to accumulators to capture and store as much liquid phase ammonia as possible and rooftop vent pipes to disperse any remaining aerosol phase ammonia to the atmosphere where it hopefully evaporates and disperses away from people.

Unfortunately, ammonia released from such rooftop vents sometimes does not properly evaporate and disperse but instead drifts to the ground in invisible ammonia clouds where it poses an unseen hazard to nearby people. Moreover, unevaporated liquid phase ammonia is sometimes ejected where it accumulates on the roof in hazardous ammonia pools until it evaporates and/or is removed by safety personnel.

SUMMARY OF THE INVENTION

Embodiments of the current invention address one or more of the above-mentioned problems and provide a distinct advance in the art of vents for hazardous gases.

One embodiment of the invention is a dilution nozzle assembly for attachment to a rooftop vent pipe for diluting and dispersing hazardous gases vented from the vent pipe. An embodiment of the dilution nozzle assembly comprises an exhaust tube connected to the vent pipe and a venturi nozzle positioned in the exhaust tube for diluting, mixing, and dispersing the hazardous gases as they pass through and out the exhaust tube.

An embodiment of the exhaust tube comprises a lower section that connects to the vent pipe for receiving the hazardous gases vented from the vent pipe; an intermediate section that connects to the lower section for receiving the hazardous gases from the lower section; and an upper section that connects to the intermediate section for receiving the hazardous gases from the intermediate section and dispersing the hazardous gases out the dilution nozzle assembly to atmosphere.

An embodiment of the venturi nozzle fits within the exhaust tube and comprises a number of ports for introducing ambient air into the exhaust tube for diluting the hazardous gases passing through the exhaust tube; an airfoil adjacent each of the ports for creating pressure differentials near the ports for drawing ambient air into the ports; a plurality of parabolic-shaped fins for creating a vortex flow in the hazardous gases and the ambient air introduced into the exhaust tube by the ports; and a pressurized air nozzle for receiving pressurized air from an air source for further diluting the hazardous gases passing through the exhaust tube and for accelerating the discharge of the hazardous gases from the exhaust tube.

The venturi nozzle may further comprise a convergent-divergent upper section that enhances the vortex flow of gases and air and that directs unevaporated liquids in the gas stream towards an inner wall of the exhaust tube. The nozzle may also include a plurality of drainage channels for collecting liquids from the inner wall of the exhaust tube and directing the liquids towards the inlet of the nozzle where they can mix with gas and air entering the nozzle and hopefully evaporate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF DRAWINGS

Embodiments of the current invention are described in detail below with reference to the attached drawing figures, wherein.

Figure 1:
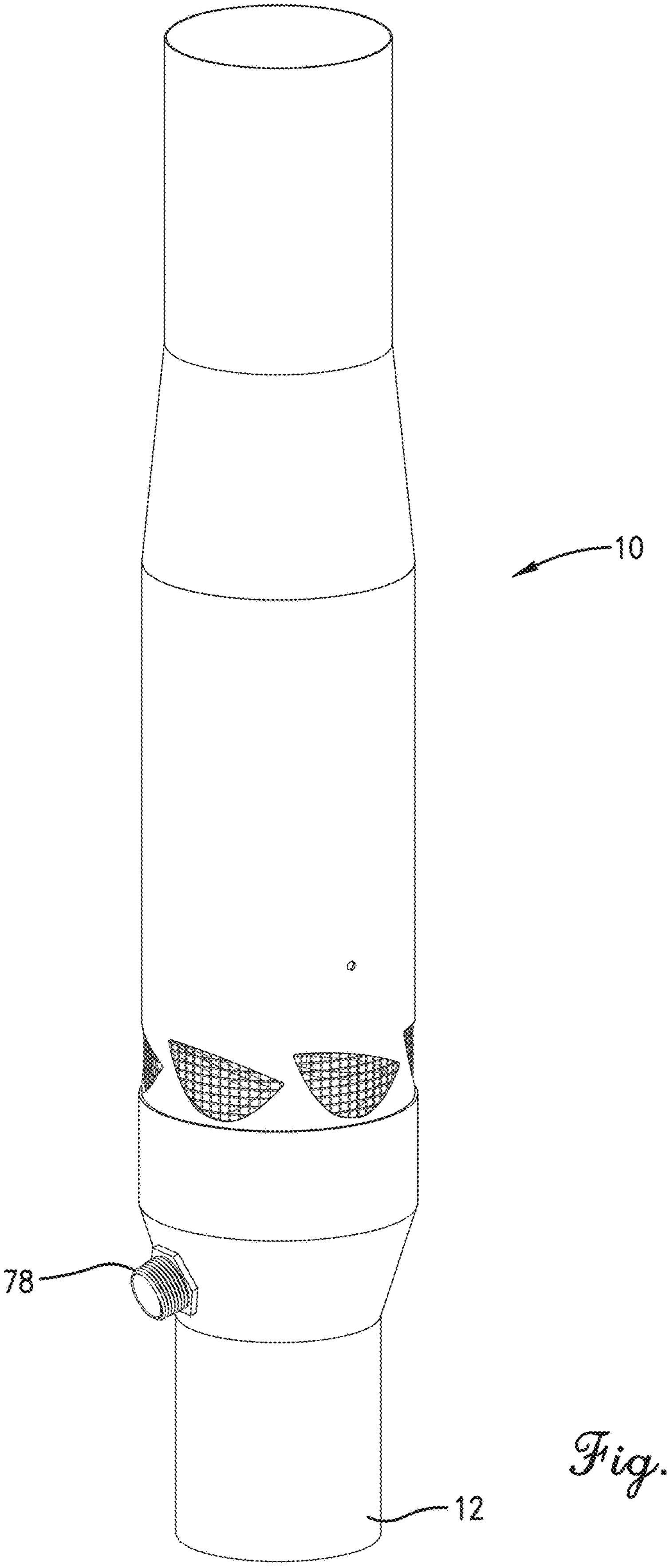
FIG. 1 is perspective view of a dilution nozzle assembly constructed in accordance with an embodiment of the invention.

The drawing figures do not limit the current invention to the specific embodiments disclosed and described herein.

The drawings are not necessarily to scale, emphasis instead being placed upon clearly illustrating the principles of the invention.

DETAILED DESCRIPTION OF THE INVENTION

Figure 13:
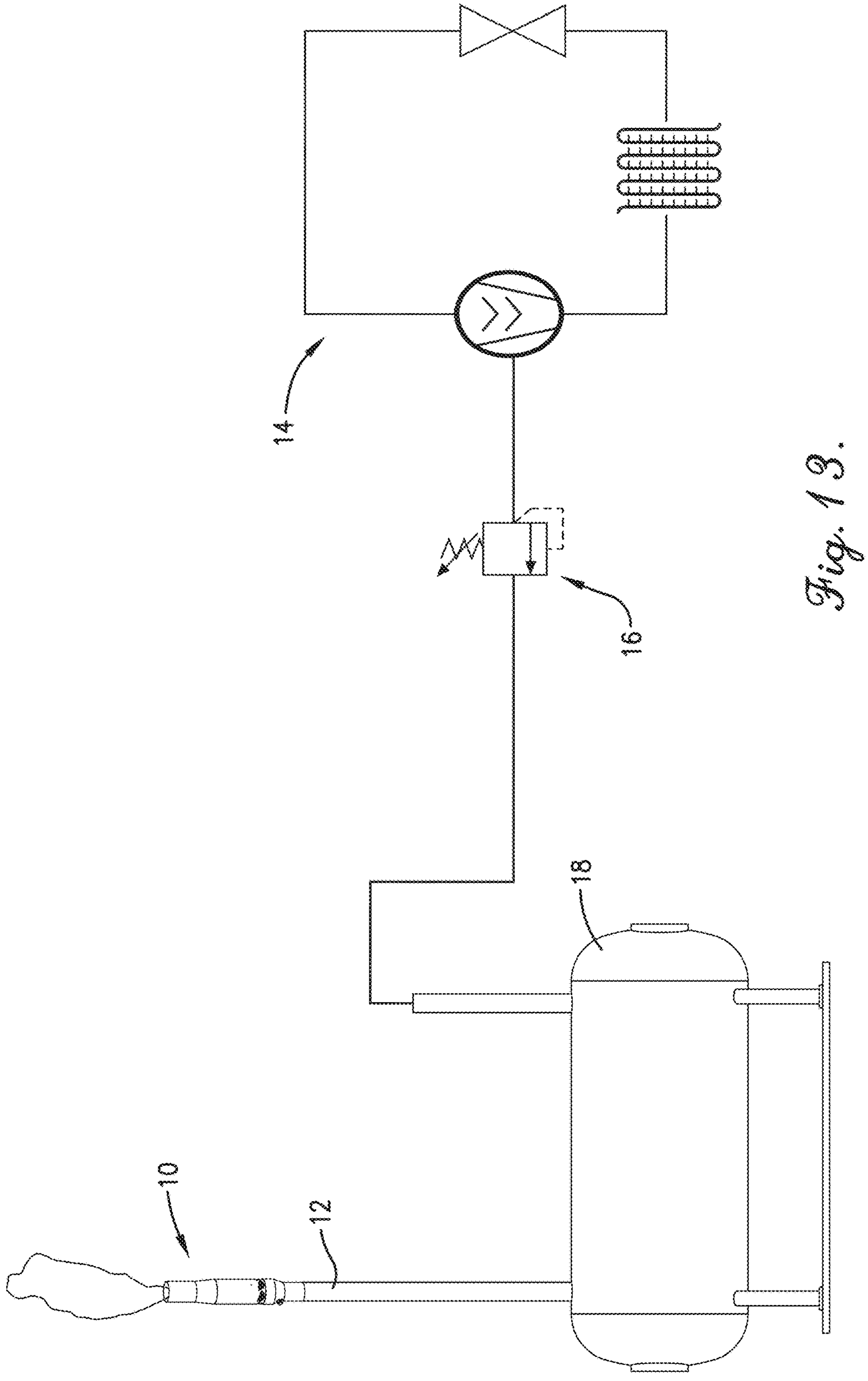
FIG. 13 is a schematic diagram of selected components of a refrigeration system to which the dilution nozzle assemblies of the present invention may be attached.

Turning now to the drawing figures, and initially FIG. 1, a dilution nozzle assembly 10 constructed in accordance with embodiments of the invention is illustrated. An embodiment of the dilution nozzle assembly 10 is configured to be attached to a rooftop vent pipe 12 for diluting and dispersing hazardous gases vented from the vent pipe. As shown in FIG. 13, the vent pipe 12 may be part of a refrigeration system 14 that uses anhydrous ammonia, where unexpected pressure buildups of the anhydrous ammonia must be vented to prevent explosions. The refrigeration system may include an overpressure safety valve 16 to deliver over pressurized ammonia to an accumulator 18 to capture and store as much liquid phase ammonia as possible. The accumulator 18 is piped to the rooftop vent pipe 12 so the vent pipe and the attached dilution nozzle assembly 10 may disperse any remaining aerosol phase ammonia to the atmosphere where it is diluted, evaporated, and dispersed away from people and animals.

Although embodiments of the dilution nozzle assembly 10 are ideally suited for diluting and dispersing anhydrous ammonia, the invention is not limited to this use only. Other embodiments of the invention may be configured for attachment to other vents, exhausts, etc. and may dilute and disperse other gases and/or be used with evaporative cooling equipment, humidification equipment, or any other system which expel gases or vaporous liquids that need to be diluted, evaporated, and/or dispersed.

Figure 2:
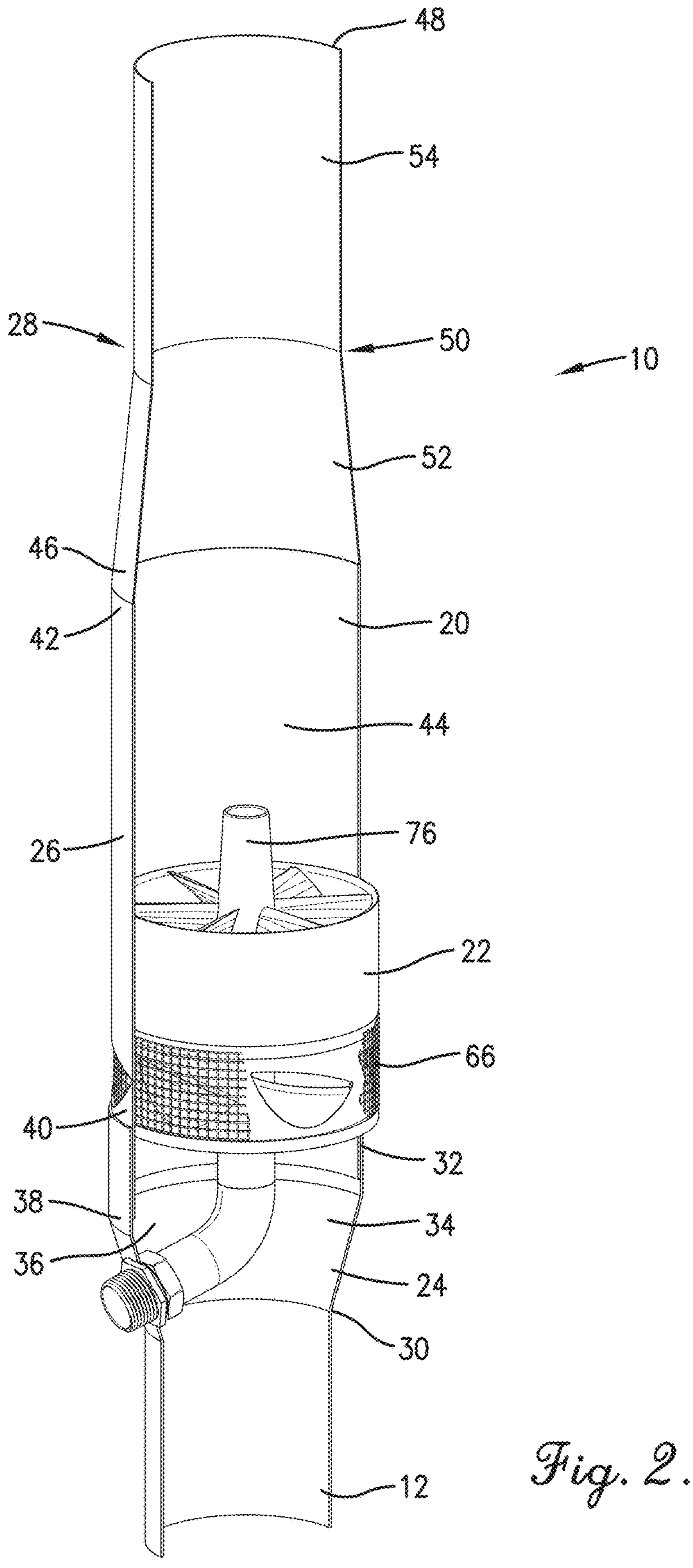
FIG. 2 is a partial vertical sectional view of the dilution nozzle assembly of FIG. 1.

As best shown in FIG. 2, an embodiment of the dilution nozzle assembly 10 broadly comprises an exhaust tube 20 connected to the vent pipe 12 and a venturi nozzle 22 positioned in the exhaust tube for diluting and dispersing hazardous gases vented from the vent pipe as they pass through the exhaust tube. Although the venturi nozzle 22 is best suited for use with the exhaust tubes described herein, it may also be installed directly in the vent pipe 12.

The exhaust tube 20 may be constructed of any rigid, weatherproof materials such stainless steel, other metals, PVC, other synthetic resin materials, or any other materials that are not easily corroded by ammonia and/or other hazardous gases. An embodiment of the exhaust tube 20 comprises a lower section 24, an intermediate section 26, and an upper section 28. The sections 24, 26, 28 can be integrally formed in one piece or formed separately and then glued, welded, screwed, or otherwise fastened together.

The lower section 24 connects to the vent pipe 12 for receiving the hazardous gases vented from the vent pipe and has an inlet end 30, an outlet end 32, and a sidewall 34 connecting the ends 30, 32. The lower section 24 may have any length, and in one embodiment, is approximately 3-6" long.

In one embodiment, the inlet end 30 of the lower section 24 has an inside diameter that is approximately equal to the outside diameter of the vent pipe 12 so the inlet end fits over the vent pipe. The outlet end 32 has an inside diameter that is greater than the inside diameter of the inlet end, and the sidewall has a divergently flared section 36 and a straight section 38. In one particular embodiment, the inlet end 30 has an inside diameter of approximately 4" to fit over a 4" vent pipe 12 and the outlet end 32 has an inside diameter of approximately 6".

The intermediate section 26 of the exhaust tube 20 has an inlet end 40 that connects to the outlet end 32 of the lower section 24 for receiving the hazardous gases from the lower section; an outlet end 42 that delivers the hazardous gases to the upper section 28; and a tubular sidewall 44 that connects the inlet end 40 and the outlet end 42. The intermediate section 26 may have any length, and in one embodiment, is approximately 6-18" long. In one embodiment, the tubular sidewall 44 has a constant inside diameter of approximately 6".

The upper section 28 of the exhaust tube 20 connects to the intermediate section 26 for receiving the hazardous gases from the intermediate section and dispersing the hazardous gases to the surrounding atmosphere. In the illustrated embodiment, the upper section 28 has an inlet end 46 that connects to the outlet end 42 of the intermediate section; an outlet end 48; and a connecting sidewall 50. The upper section may have any length, and in one embodiment, is approximately 6-12" long. In a particular embodiment, the inlet end 46 has an inside diameter of approximately 6", the outlet end 48 has an inside diameter of approximately 5", and the sidewall 50 has a converging section 52, and a constant diameter section 54 of approximately 5".

An embodiment of the venturi nozzle 22 will now be described primarily with reference to FIGS. 3-7. The nozzle 22 fits within the intermediate section 26 of the exhaust tube 20 but may be placed elsewhere in the exhaust tube or even directly in the vent pipe 12. As explained in more detail below, the venturi nozzle 22 comprises a number of features for: 1) diluting and mixing hazardous gases dispelled from the vent pipe with ambient air; 2) creating a vortex flow of gases and ambient air through the exhaust tube; and 3) accelerating, expelling, and dispersing the diluted gases high above the building from which the vent pipe extends. The nozzle may be constructed of any rigid, weatherproof materials, and in one embodiment, is 3-D printed from resin materials that are not easily corroded by ammonia and/or other hazardous gases.

Figure 4:
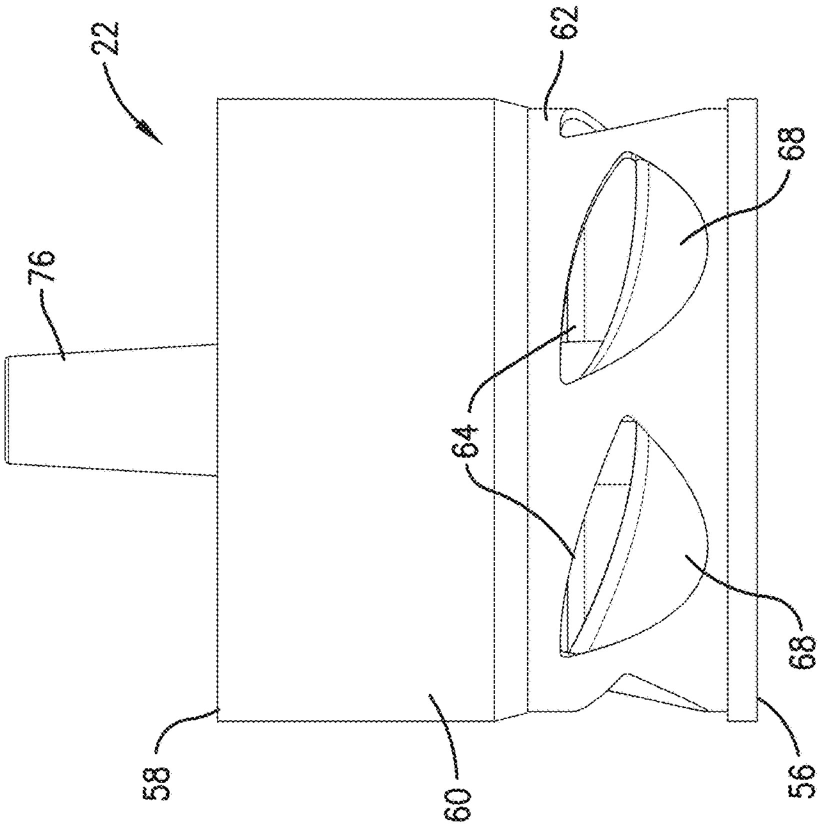
FIG. 4 is an elevational view of the venturi nozzle of FIG. 3.
Figure 3:
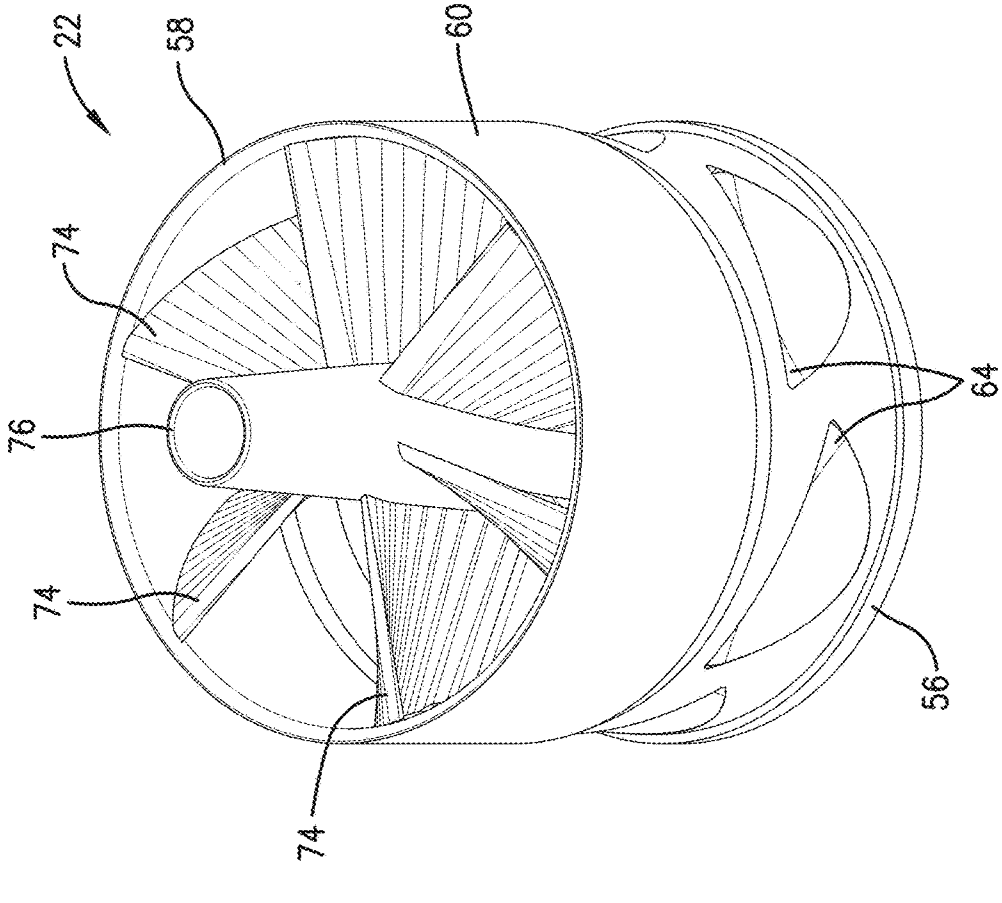
FIG. 3 is a top perspective view of a venturi nozzle constructed in accordance with an embodiment of the invention and shown removed from its exhaust tube.

As shown in FIGS. 3 and 4, the nozzle 22 comprises an inlet end 56, an outlet end 58, and a connecting sidewall 60. In one embodiment, the inlet and outlet ends 56, 58 and the sidewall 60 have outside diameters of a bit less than 6" so as to fit within the 6" intermediate section 26 of the exhaust tube. Embodiments of the sidewall 60 may have a reduced diameter section 62.

The nozzle 22 also comprises a number of ports 64 that are aligned with holes formed in the intermediate section 26 of the exhaust tube for introducing ambient air into the exhaust tube for diluting the hazardous gases passing through the exhaust tube. In one embodiment, the ports 64 are tear-drop shaped, with each having an open area of at least one square inch. In one particular embodiment, the nozzle has six ports 64 spaced along its circumference and located in the reduced diameter section 62 as illustrated. As best shown in FIG. 2, a screen 66 may be installed in the reduced diameter section 62 to prevent debris such as leaves, sticks, etc. from entering the nozzle through the ports 64.

Figure 6:
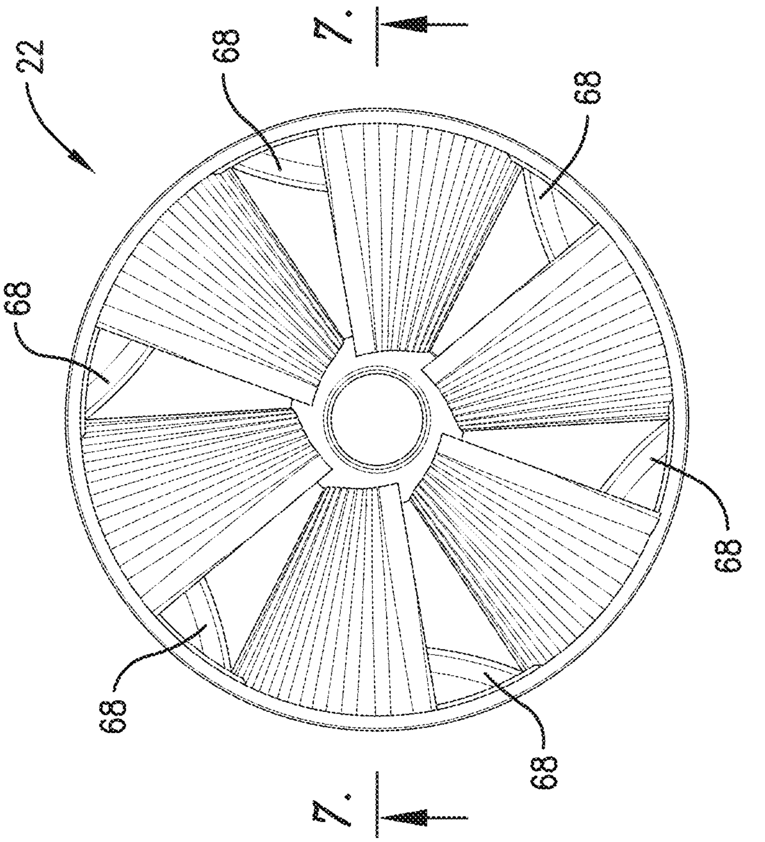
FIG. 6 is a top view of the venturi nozzle of FIG. 3.
Figure 5:
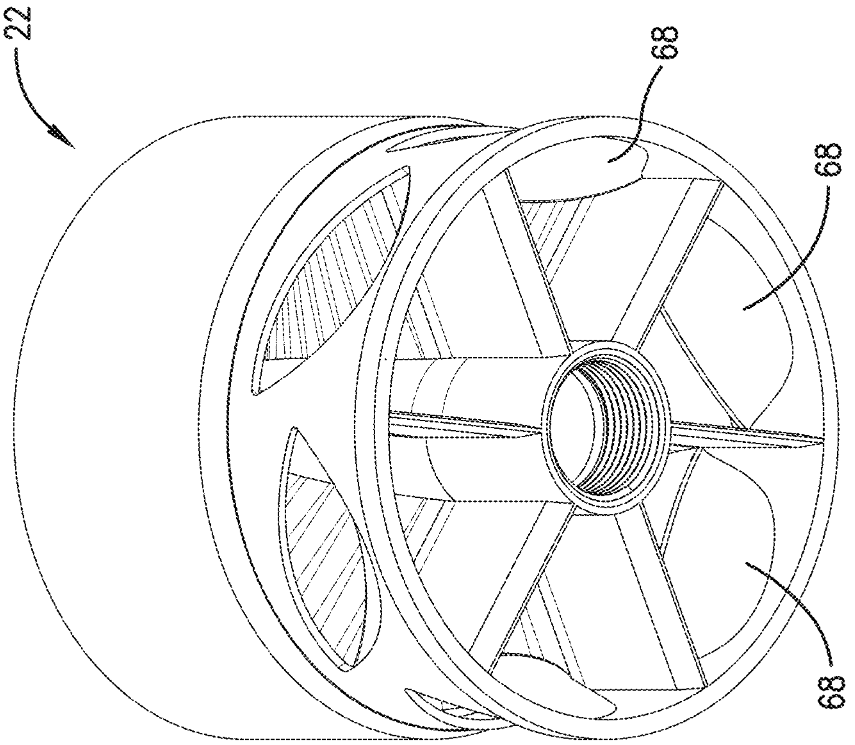
FIG. 5 is a bottom perspective view of the venturi nozzle of FIG. 3.
Figure 7:
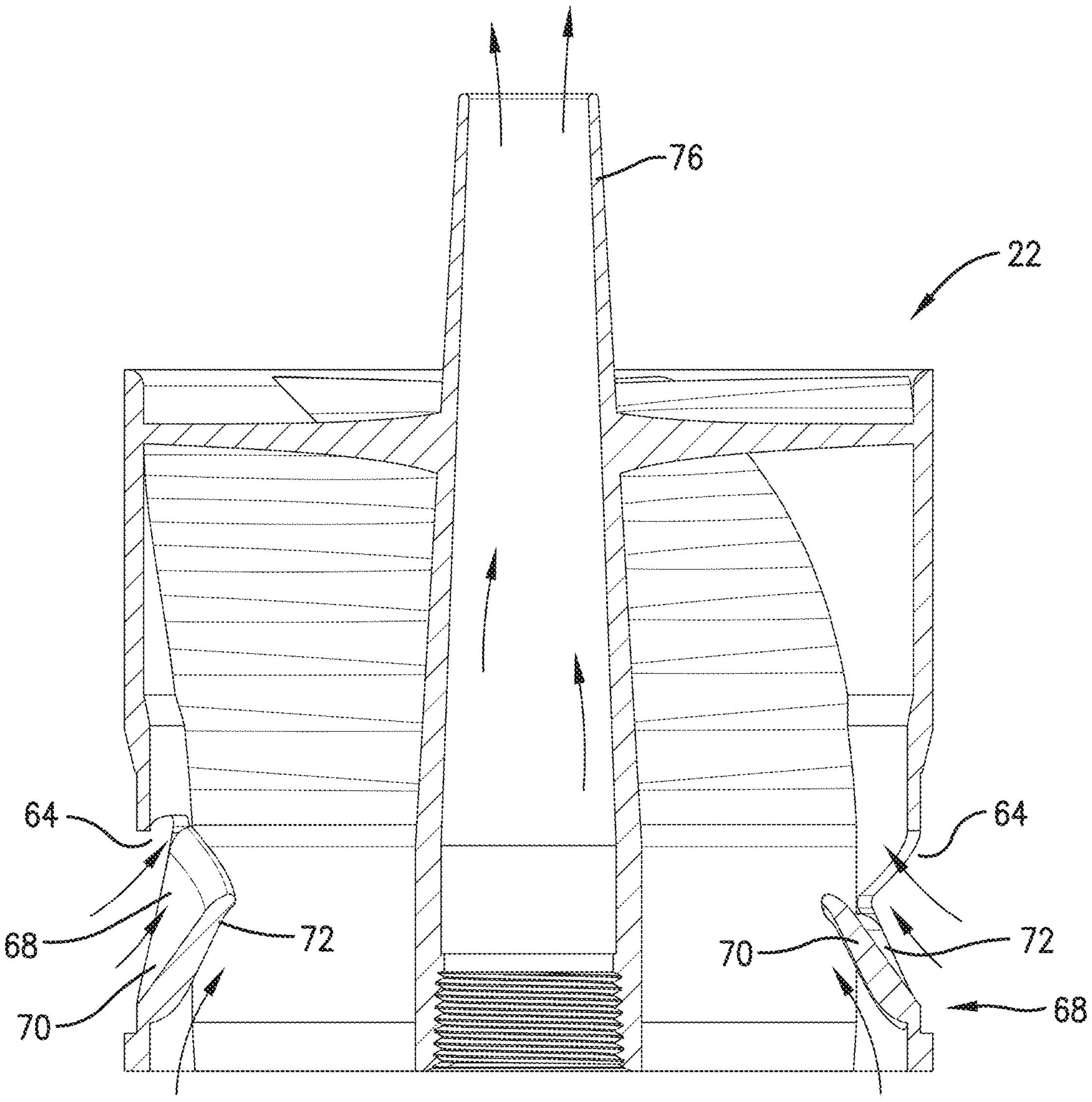
FIG. 7 is a vertical sectional view of the venturi nozzle of FIG. 3 taken along line 7/7 of FIG. 6.

As best shown in FIGS. 5-7, embodiments of the nozzle 22 also comprise a plurality of airfoils 68, one adjacent each of the ports 64. The airfoils 68 create pressure differentials near the ports 64 for drawing more ambient air into the ports. As best shown in FIG. 7, each airfoil 68 has a variable wall thickness with an inner, curved wall 70 that creates a longer air flow path across its surface and an outer, relatively straighter wall 72 that creates a relatively shorter air flow path across its surface. The airfoils induce a Bernoulli effect similar to an aircraft wing to create a pressure gradient adjacent the ports 64, with relatively lower pressure gases from the vent pipe passing by the inner curved walls 70 and higher pressure ambient air passing by the outer straighter walls 72 to draw more ambient air through the ports 64 and into the nozzle 22 to mix with the hazardous gases.

As best shown in FIG. 3, embodiments of the nozzle 22 may also comprise a plurality of parabolic-shaped fins 74. One embodiment of the nozzle 22 comprises six of the fins 74. The fins 74 redirect the flow of gases and air through the nozzle to create a vortex that mixes and dilutes the hazardous gases with the ambient air introduced into the ports 64.

In one embodiment, the fins 74 are shaped and positioned as shown to create a counterclockwise flow pattern through and out the exhaust tube. This counterclockwise flow offsets the Coriolis effect, in which air is deflected toward the right in the Northern Hemisphere and toward the left in the Southern Hemisphere, resulting in curved air paths. The counterclockwise flow pattern created by the parabolic-shaped fins 74 causes gases dispersed from the exhaust tube to resist the rightward bias of the Coriolis effect to travel more vertically into the atmosphere to aid in dispersing the gases higher above the vent tube where the gases are more likely to evaporate and disperse. If the nozzle assembly is to be used in the southern hemisphere, the curvature of the fins is reversed to create a clockwise vortex gas flow pattern.

As best shown in FIG. 3, embodiments of the nozzle 22 may also comprise an air nozzle 76 that is pneumatically connected to an air fitting 78 (FIG. 1). The air nozzle 76 receives pressurized air from an air source and directs it into the exhaust tube for further diluting the hazardous gases passing through the exhaust tube and for accelerating the discharge of the hazardous gases from the exhaust tube. In one embodiment, the air nozzle serves as a hub for fins 74.

A venturi nozzle 100 constructed in accordance with another embodiment of the invention is illustrated in FIGS. 8-12. Only aspects of the nozzle 100 that are different than the nozzle 22 will be described in detail. For simplicity, the components of the nozzle 100 that are essentially the same as the nozzle 22 will be identified by the same reference numerals.

Figure 8:
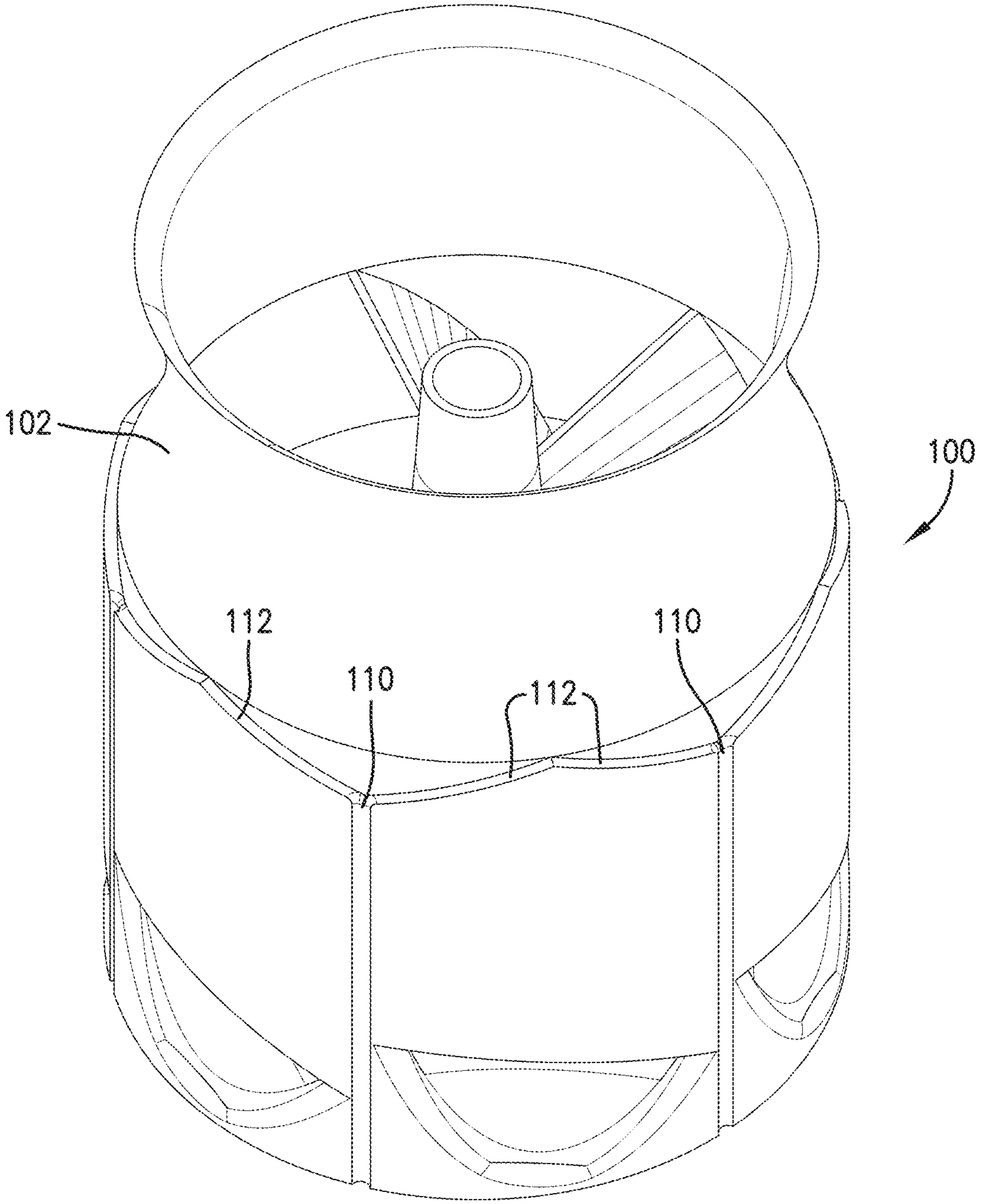
FIG. 8 is a top perspective view of a venturi nozzle constructed in accordance with another embodiment of the invention and shown removed from its exhaust tube.
Figure 10:
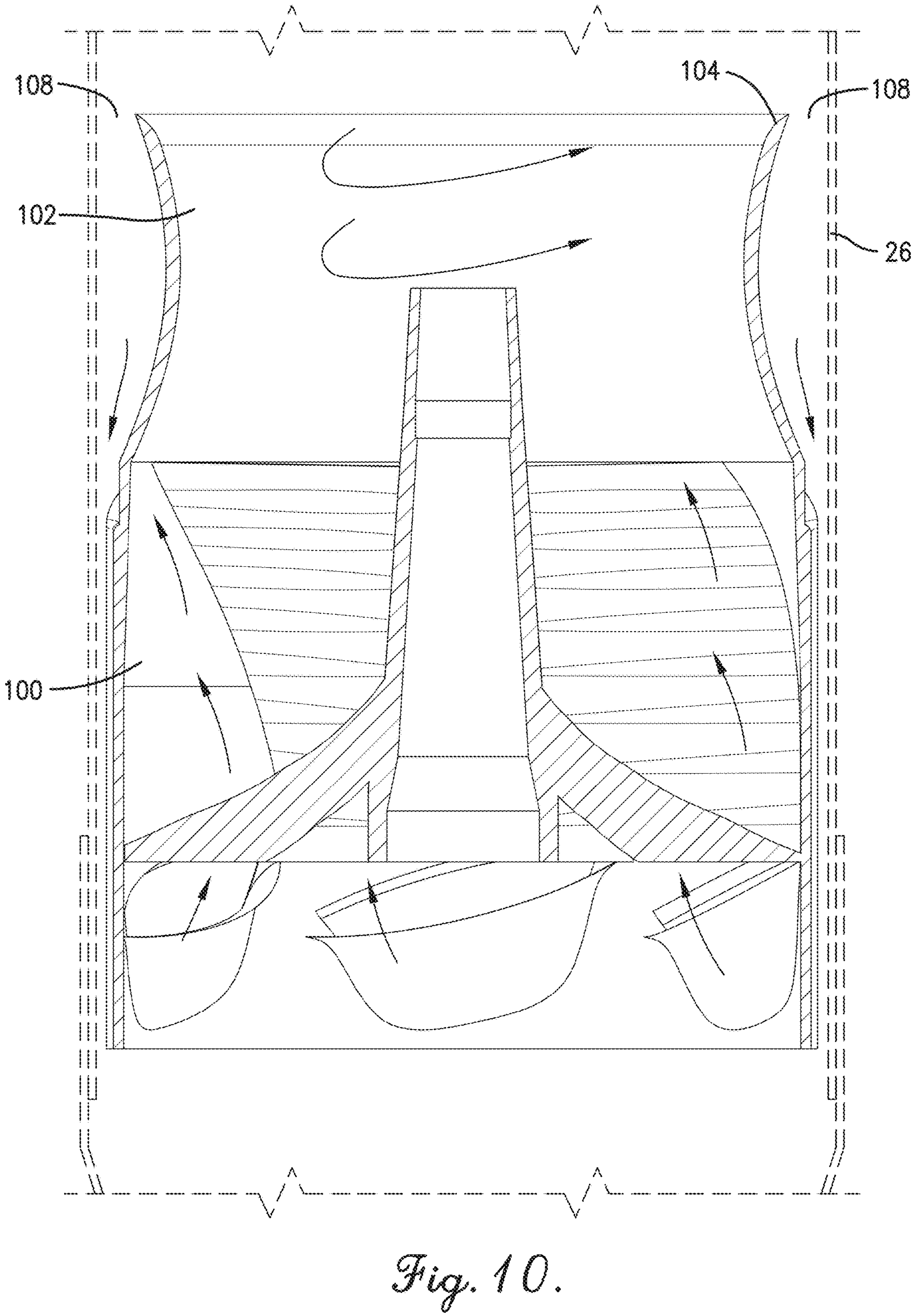
FIG. 10 is a vertical sectional view of the venturi nozzle of FIG. 8 taken along line 10/10 of FIG. 9.
Figure 11:
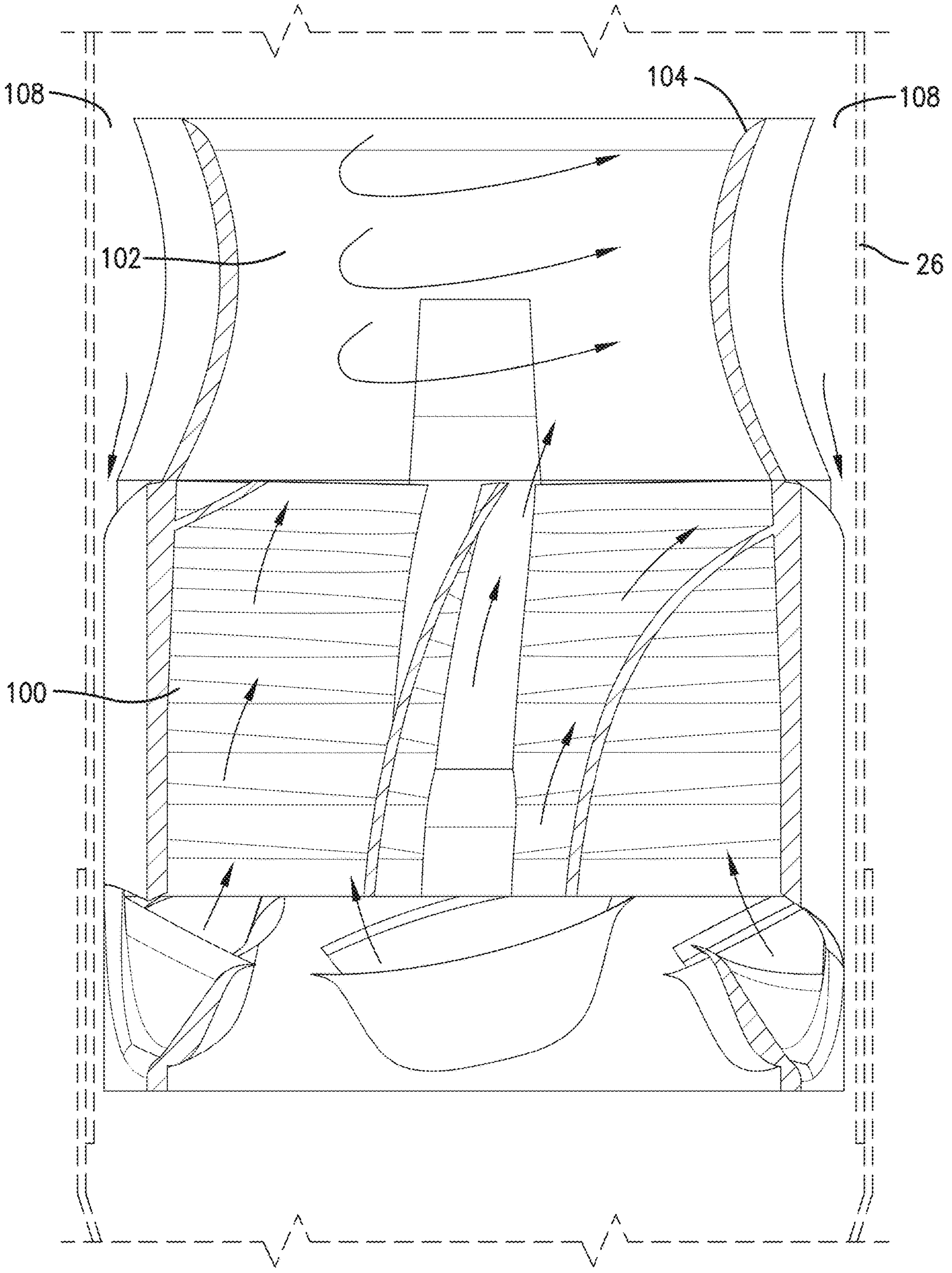
FIG. 11 is a vertical sectional view of the venturi nozzle of FIG. 8 taken along line 11/11 of FIG. 9.

As best shown in FIG. 8, the nozzle 100 comprises a convergent-divergent upper section 102 that accelerates and enhances the vortex flow in the hazardous gases and the ambient air as they exit the nozzle 100. As best shown in FIG. 10, the outlet 104 of the convergent-divergent upper section 102 has a smaller diameter than the intermediate section 26 of the exhaust tube 20, creating a gap 108 between the convergent-divergent upper section 102 and the exhaust tube. The vortex flow created and enhanced by the convergent-divergent upper section 102 directs any liquid aerosol drops or other liquids in the gas flow towards the inner surface of the exhaust tube where the liquid, fall through the gaps 108 and down the exhaust tube as depicted by the downwardly pointing arrows in FIG. 10.

Figure 9:
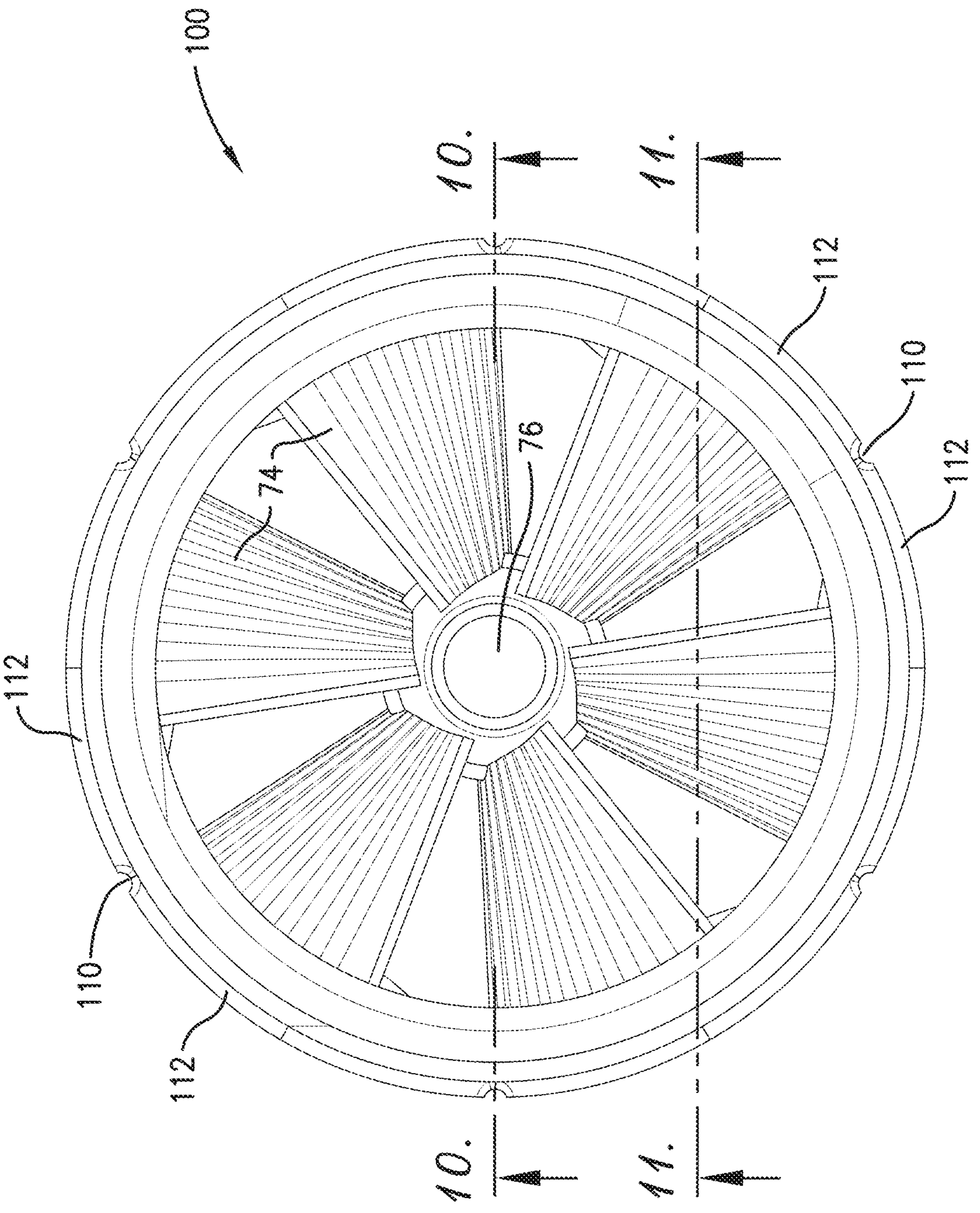
FIG. 9 is a top view of the venturi nozzle of FIG. 8.

As best shown in FIGS. 8 and 9, the nozzle 100 also comprises a plurality of drainage channels 110 and sloped walls 112 leading to the drainage channels 110 for collecting liquids from the inner wall of the exhaust tube and directing them toward the inlet of the nozzle 100 where they can again mix with gases from the vent pipe and the ambient air introduced into the nozzle.

Figure 12:
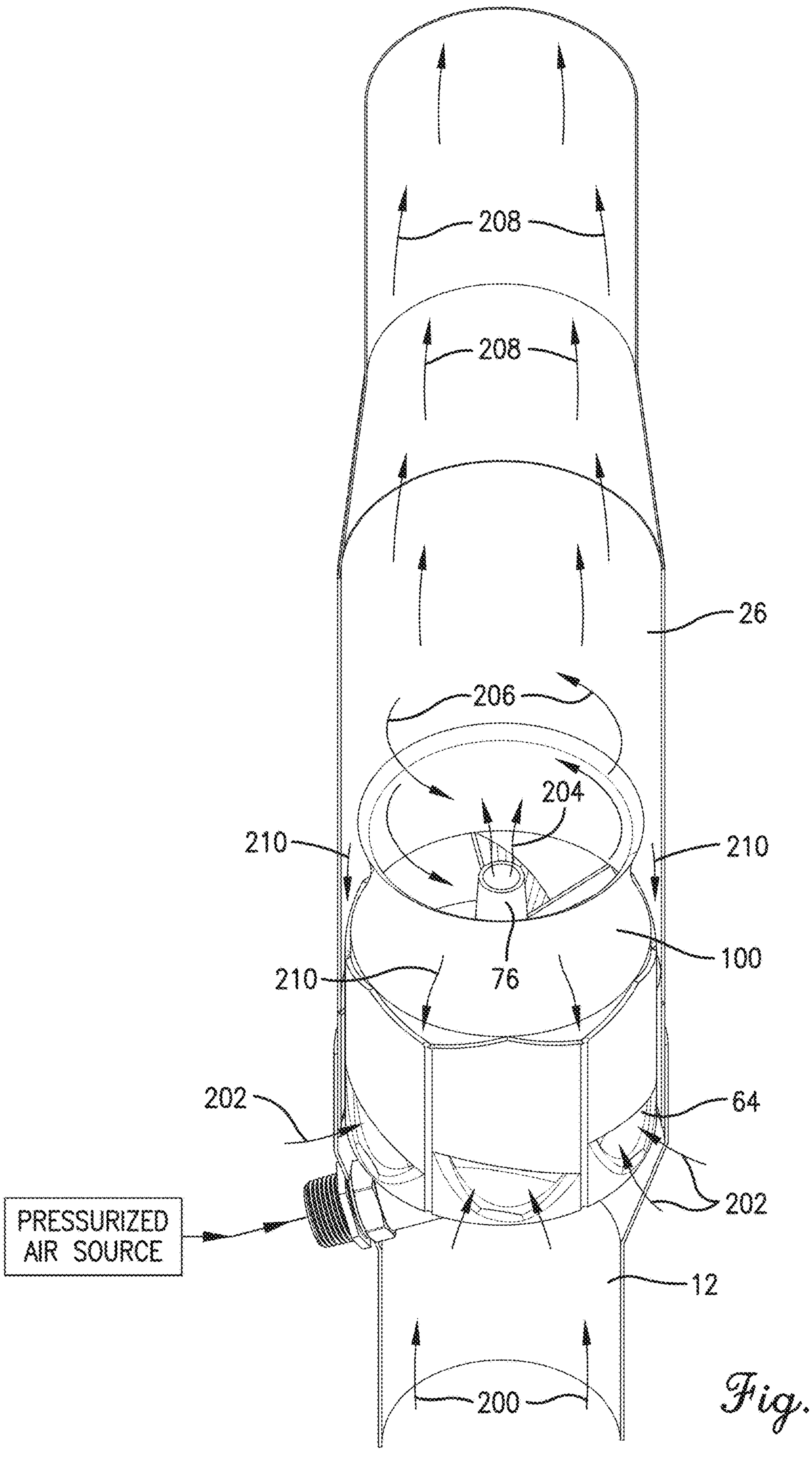
FIG. 12 is partial vertical sectional view of the venturi nozzle of FIG. 8 shown in its exhaust tube with arrows indicating gas and fluid flow through and out the exhaust tube.

The flow of gases, air, and liquids into and through the nozzle 100 will now be summarized primarily with reference to FIG. 12. Hazardous gases indicated by the arrows 200 enter the nozzle via the vent pipe 12. At the same time, ambient air indicated by the arrows 202 is introduced through the air ports 64 and pressurized air indicated by the arrows 204 is emitted from the air nozzle 76. The vanes 74 mix the ambient air 202 with the hazardous gases 200, and these mixed air and gases are further mixed and diluted with the pressurized air 204. The nozzle also creates a vortex flow of the diluted and mixed gases as indicated by the arrows 206 and accelerate and expel the diluted gases from the exhaust tube as indicated by the arrows 208. Unevaporated liquids in the gas stream indicated by the arrows 210 collect on the inner surface of the exhaust tube and flow through the drainage channels 110 toward the inlet of the nozzle 100 where they can again mix with gases 200 from the vent pipe and the ambient air 202 introduced into the nozzle. The nozzle 22 operates in basically the same way except it doesn't include convergent-divergent upper section 102 and the drainage channels 110.

In addition to the functions described above, embodiments of the dilution nozzle assembly perform a multitude of functions. The one-piece venturi nozzle along with the exhaust tube with the converging outlet creates a forced high-speed airstream with a pressure drop from the exit of the venturi nozzle. This produces a pressure drop in gases and air exiting the nozzle above the turbine fins. The high-speed low-pressure stream from the nozzle is strategically located slightly below the 6 inch to 5 inch diameter convergent section of the exhaust tube. Also, the negative pressure or vacuum created by the nozzle draws in ambient air through the side inlets for further dilution of gases. The vacuum or lower pressure promotes evaporation and dilution of the hazardous gases by lowering their boiling point. The air entering the nozzle is also heated up from the compression and friction within the nozzle. This additional heat also promotes evaporation and boiling of the saturated liquid vapor phase gases. Further dilution of the hazardous gases occurs from the ambient air forced into the 6" nozzle section before the exhaust tube where the vortex, boiling of liquid, and heating of gases and air all act together to dilute the vented gases into a manageable super-heated vapor with upward force away from the building from which the gas is vented. Additional dilution and evaporation also occur near the exterior of the exhaust tube. Transitioning from a 6-inch section to a 5-inch section increases the exhaust velocity creating a tornadic low pressure column of the diluted hazardous gases in an upward spiraling vortex that draws in additional surrounding ambient air for dilution.

Additional Considerations

The detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The detailed description is, therefore, not to be taken in a limiting sense. The scope of the current invention is defined only by the appended claims, along with the full scope of equivalents to which such claims are entitled.

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A dilution nozzle assembly for attachment to a vent pipe for diluting and dispersing hazardous gases vented from the vent pipe, the dilution nozzle assembly comprising:

a lower section that connects to the vent pipe for receiving the hazardous gases vented from the vent pipe, wherein the lower section has an inlet end with an inside diameter, an outlet end with an inside diameter that is greater than the inside diameter of the inlet end, and a tubular, divergently flared sidewall that connects the inlet end and the outlet end;

an intermediate section that connects to the lower section for receiving the hazardous gases from the lower section;

an upper section that connects to the intermediate section for receiving the hazardous gases from the intermediate section and dispersing the hazardous gases out the dilution nozzle assembly to atmosphere; and a nozzle assembly within the intermediate section, the nozzle assembly comprising:

ports for introducing ambient air into the intermediate section for diluting the hazardous gases passing through the intermediate section;

structure for creating a vortex flow in the hazardous gases passing through the intermediate section and the ambient air introduced into the intermediate section by the ports; and a pressurized air nozzle for receiving pressurized air from an air source and directing it into the intermediate section and toward the upper section for further diluting the hazardous gases passing through the intermediate section and for accelerating the discharge of the hazardous gases from the upper section.

2. The dilution nozzle assembly of claim 1, wherein the intermediate section has an inlet end that connects with the outlet end of the lower section; an outlet end; and a tubular sidewall that connects the inlet end and the outlet end, the tubular sidewall having a constant inside diameter.

3. The dilution nozzle assembly of claim 2, wherein the upper section has an inlet end joined to the outlet end of the intermediate section, an outlet end, and a tubular convergently flared sidewall that connects the inlet end and the outlet end.

4. The dilution nozzle assembly of claim 1, wherein the nozzle assembly further comprises an airfoil adjacent each of the ports for creating pressure differentials near the ports for drawing ambient air into the intermediate section.

5. The dilution nozzle assembly of claim 1, wherein the structure for creating the vortex flow comprises a plurality of parabolic-shaped fins positioned around the pressurized air nozzle.

6. The dilution nozzle assembly of claim 1, wherein the inside diameter of the inlet end of the lower section is approximately 4 inches, wherein the intermediate section has an inside diameter of approximately 6 inches, and wherein the upper section has an inside diameter of approximately 6 inches.

7. The dilution nozzle assembly of claim 1, wherein the nozzle assembly further comprises a convergent-divergent upper section that enhances the vortex flow in the hazardous gases and the ambient air in the intermediate section and that directs liquids towards an inner wall of the intermediate section.

8. The dilution nozzle assembly of claim 7, wherein the nozzle assembly further comprises a plurality of drainage channels for collecting liquids from the inner wall of the intermediate section and directing the liquids towards the lower section.

9. A dilution nozzle assembly for attachment to a vent pipe for diluting and dispersing hazardous gases vented from the vent pipe, the dilution nozzle assembly comprising:

an exhaust tube comprising;

a lower section that connects to the vent pipe for receiving the hazardous gases vented from the vent pipe wherein the lower section has an inlet end with an inside diameter; an outlet end with an inside diameter that is greater than the inside diameter of the inlet end; and a tubular, divergently flared sidewall that connects the inlet end and the outlet end;

an intermediate section that connects to the lower section for receiving the hazardous gases from the lower section, wherein the intermediate section has an inlet end that connects with the outlet end of the lower section, an outlet end, and a tubular sidewall that connects the inlet end and the outlet end, the tubular sidewall having a constant inside diameter; and an upper section that connects to the intermediate section for receiving the hazardous gases from the intermediate section and dispersing the hazardous gases out the dilution nozzle assembly to atmosphere; and a nozzle assembly within the exhaust tube, the nozzle assembly comprising:

ports for introducing ambient air into the exhaust tube for diluting the hazardous gases passing through the exhaust tube;

a plurality of parabolic-shaped fins for creating a vortex flow in the hazardous gases and the ambient air introduced into the exhaust tube by the ports; and a pressurized air nozzle for receiving pressurized air from an air source and directing it into the exhaust tube for further diluting the hazardous gases passing through the exhaust tube and for accelerating the discharge of the hazardous gases from the exhaust tube.

10. The dilution nozzle assembly of claim 9, further compromising:

an airfoil adjacent each of the ports for creating pressure differentials near the ports for drawing ambient air into the ports.

11. The dilution nozzle assembly of claim 9 wherein the upper section has an inlet end joined to the outlet end of the intermediate section, an outlet end, and a tubular convergently flared sidewall that connects the inlet end and the outlet end.

12. The dilution nozzle assembly of claim 9, wherein the inside diameter of the inlet end of the lower section is approximately 4 inches, wherein the intermediate section has an inside diameter of approximately 6 inches, and wherein the upper section has an inside diameter of approximately 6 inches.

13. The dilution nozzle assembly of claim 9, wherein the nozzle assembly further comprises a convergent-divergent upper section that creates enhances the vortex flow in the hazardous gases and the ambient air in the intermediate section and that directs liquids towards an inner wall of the intermediate section.

14. The dilution nozzle assembly of claim 13, wherein the nozzle assembly further comprises a plurality of drainage channels for collecting liquids from the inner wall of the intermediate section and directing the liquids towards the lower section.

15. A nozzle assembly for attachment to a vent for diluting and dispersing hazardous gases vented from the vent, the nozzle assembly comprising:

ports for introducing ambient air into the nozzle assembly or diluting the hazardous gases passing through the nozzle assembly;

an airfoil adjacent each of the ports for creating pressure differentials near the ports for drawing ambient air into the ports;

a plurality of parabolic-shaped fins for creating a vortex flow in the hazardous gases and the ambient air introduced into the nozzle assembly by the ports;

a pressurized air nozzle for receiving pressurized air from an air source and directing it toward the hazardous gases in the nozzle assembly for further diluting the hazardous gases passing through the nozzle assembly and for accelerating the discharge of the hazardous gases from the nozzle assembly;

a convergent-divergent upper section that enhances the vortex flow in the hazardous gases and the ambient air in the nozzle assembly and that directs liquids towards an inner wall of the nozzle assembly; and a plurality of drainage channels for collecting liquids from the inner wall of the nozzle assembly and directing the liquids towards a lower section of the nozzle assembly.

* * * * *